Patented June 22, 1943

2,322,311

UNITED STATES PATENT OFFICE 2,322,311

CARBOXYLATED ESTROGENIC HORMONES

Joseph B. Niederl, Brooklyn, N. Y.

No Drawing. Application February 15, 1940,
Serial No. 319,058

19 Claims. (Cl. 260—397.1)

This invention relates to new estrogenic compounds and to methods of producing the same. More particularly it relates to carboxylated phenolic estrogenic hormones, to various derivatives thereof and to methods of producing the same from crude estrogenic extract derived from the customary urinary sources as well as from partially or completely purified phenolic hormones.

In accordance with one embodiment of the invention, crude phenolic estrogenic hormone extract is treated to form sodium salts of the hormones therein by reaction with metallic sodium and the resulting salts are heated under substantially anhydrous conditions to a temperature of 180° C. in the presence of an inert gas and thereafter dry carbon dioxide is introduced into the hot mass at atmospheric pressure until carboxylation of the hormone molecules has occurred, the reaction being facilitated by the presence of a quantity of glass wool in the reaction mass. The reaction product is then cooled without exposing the same to the deleterious effect of the atmosphere and the carboxylated hormones are separated and purified by conventional procedure.

Basically considered, the instant process is seen to involve the introduction of the carboxylic group into the phenolic benzene ring of estrogenic hormones. The carboxylation process basically resembles a prior process known as the Kolbe synthesis, wherein, for example, salicylic acid is produced by treating sodium phenolate with carbon dioxide under superatmospheric pressure at a temperature of 130° C. Although the present process likewise involves the reaction of carbon dioxide with sodium salts of phenolic compounds, the prior reaction conditions are unsatisfactory and commercially inoperable for the production of carboxylated estrogenic hormones.

The instant process is applicable to the treatment of phenolic estrogenic compounds in general, including not only various crude and partially purified extracts from natural sources, but also such compounds as estrone, estradiol, estriol, equilin, equilenin, hippulin, dihydroneoergosterol, as well as mixtures thereof, and also sterols having free phenolic groups.

Early attempts by the present applicant to carboxylate these estrogenic compounds were unsuccessful and it was not until new conditions and several novel steps were adopted that a satisfactory carboxylation process was developed leading to high commercial yields. In addition to other functions, these steps serve to prevent oxidative and otherwise destructive side reactions from occurring. The individual factors contributing to the success of the process will be discussed separately.

The temperature best suited for the carboxylation reaction was found not to be around 130° C., but to be of the order of 180° C. Lower temperatures down to 140° C. gave operable results. Higher temperatures could be used provided they were not sufficiently elevated to melt or decompose the hormone, temperatures of from 210-250° C. being utilizable.

Satisfactory operation of the process was obtained only when steps were taken to exclude at least in part several deleterious compounds, including water, air and hydrogen chloride. The water and air were excluded (1) by conducting the heating under atmospheric pressure, thereby enabling the moisture to escape; (2) by continuously introducing an inert gas such as hydrogen and nitrogen into the reaction vessel during the period of heating the mass to the temperature at which the carboxylation reaction takes place; (3) by preliminarily removing all moisture from the said inert gas and as well from the carbon dioxide later used, before the same is introduced into the reaction vessel, and (4) by excluding air from the reaction products during the cooling operation, the latter being most easily accomplished by maintaining an atmosphere of carbon dioxide. Hydrogen chloride and other undesirable gases were excluded by passing the inert gases and carbon dioxide through a suitable washing solution such as sodium carbonate. This step can be dispensed with if sources of pure gases are available.

In eliminating the use of superatmospheric pressure, the instant process has a material advantage with respect to operation and cost of equipment.

Another feature contributing to the success of the process resides in the provision of means for exposing an extended surface area of the salt of the hormone to the carbon dioxide during the introduction of the latter in the reaction vessel. This extension of surface area was very effectively obtained simply by incorporating in the reaction vessel a quantity of an absorbent or adsorbent material, such as glass wool or preignited asbestos. Alternatively the effect may be obtained by an agitation of the mass of a sufficient severity to prevent incrustation and to obtain a fine disribution or intimate mixture of the salts with the gas.

The carboxylation effected by the instant invention produces from the phenolic estrogenic hormones compounds which may be referred to as salicylic estrogenic hormones. These new compounds are of particular value to the pharmaceutical industry because of the wide variety of the derivatives which may be made therefrom and the ease with which they may be synthesized. The present invention extends to these derivatives as new compounds.

Among the derivatives there may be mentioned the salts and the esters produced by the introduction of appropriate atoms or atomic groups by reaction at the phenolic hydroxy radical, or at the carboxyl radical, or at both radicals. Thus the carboxylated compounds may be neutralized to form either water soluble salts or water insoluble salts, with various bases such as those of the alkali metals. They may be esterified at the carboxyl group with alkyl, alkylene, aryl, or cycloalkyl radicals, examples of the same being methyl, ethyl, capryl, nonyl, stearyl, oleyl, benzyl and cyclohexyl. The esterification may be effected, for example, by reacting the free acid with methyl or ethyl alcohol in the presence of dry hydrogen chloride gas, or by the interaction of its alkali metal salt with the alkyl halide corresponding to any of the alcohols.

Other types of ester derivatives of the carboxylated hormones may be obtained by acylating at the phenolic hydroxy radical through conventional procedure to form the acetates, caprylates, laurates, cetylates, oleates, benzoates, phenyl acetates or other saturated or unsaturated fatty acid and aryl acid esters.

The carboxylated hormones and the above mentioned derivatives may be altered in other ways or at other points in the molecules. For example, carboxylated estrone, or its ester or salts, may be reacted at the ketonic oxygen atom with acetylene to produce the corresponding ethenyl diol carboxylated compound. Furthermore, the said carboxylated estrone compounds may be reduced by suitable hydrogenation procedure to form novel carboxylated estradiols and derivatives.

*Example 1*

Six parts by weight of crude estrogenic hormone extract containing a mixture of phenolic hormones are mixed with one part of metallic sodium contained in a suitable quantity of absolute alcohol. The resulting mixture is thereafter heated to a temperature of from 170–190° C. in an atmosphere of hydrogen provided by introducing into the reaction mass a stream of substantially dry purified hydrogen. When the temperature reaches the degree indicated, the introduction of hydrogen is discontinued and in its place there is introduced a stream of substantially dry carbon dioxide. The reaction vessel is provided with a quantity of glass wool in a volume substantially in excess of that occupied by the hormones. The introduction of carbon dioxide is discontinued when the carboxylation is substantially complete, which ordinarily takes about two hours. The reaction mass is then permitted to cool in the presence of carbon dioxide. Next, the cool reaction product is purified in any suitable manner for the removal of any unreacted raw material or other undesired reaction products. Purification may be accomplished by alternate neutralization, filtration, acidification and extraction with organic solvent. The final product obtained is composed of carboxylated phenolic estrogenic hormones.

*Example 2*

One hundred and eighty mg. of a mixture of phenolic estrogenic hormones contained in 20 cc. of absolute alcohol are mixed with a solution of 30 mg. of metallic sodium contained in 10 cc. of absolute alcohol. The combined solutions are then placed in a 100 cc. round bottomed flask containing 2 grams of pre-ignited asbestos. The flask is provided with a glass stopper having a standard glass ground joint fitting into its neck. The glass stopper is provided with a tube for the introduction of gas and an outlet tube connected to a receiver or a condenser and a receiver. If the gases to be employed in the process are to be derived from conventional producers, the said gas tube is connected to the producers through a gas purifying unit and through a suitable drying unit. The reaction flask is preferably heated by a suitable heating bath such as a metal bath provided with a thermometer.

Hydrogen or nitrogen gas is next passed through the purifying unit which may contain a sodium carbonate solution, then through the drying means and finally into the reaction flask and is discharged near the bottom thereof. The heating of the alcoholic solution of the sodium salts of the estrogenic compounds is then commenced and the alcohol which volatilizes is permitted to distill off, the same preferably being aided by the use of diminished pressure. After the alcohol is removed, the temperature gradually increases and is permitted to rise until 180° C. is reached. At this point the hydrogen or nitrogen stream is discontinued and instead carbon dioxide is introduced into the reaction flask. If the carbon dioxide to be used is directly from a producer, it is first passed through the washing unit containing the sodium carbonate solution and then through the drying tube. The introduction of the carbon dioxide gas and the heating are continued for a period of 2 hours.

Next the reaction mixture is allowed to cool to room temperature in an atmosphere of carbon dioxide. It is thereafter purified by adding thereto 20 cc. of a 20% aqueous sodium hydroxide solution and heated on a steam bath for a period of about 20 minutes. Next the mixture is filtered through a fritted glass filter. In order to recover any of the reaction product adhering to the asbestos, it is washed twice with 10 cc. portions of distilled water, these wash waters being thereafter added to the alkaline extract. The filtered extract is then acidified with a dilute aqueous hydrochloric acid solution (10%) until the mass is distinctly acid to Congo. The acidified extract is then twice extracted in a separatory funnel with 25 cc. of ether. The combined ether extracts are next washed with 30 cc. of distilled water and then extracted with 30 cc. of a 5% solution of sodium carbonate. The resulting solution is separated and then extracted with 25 cc. of ether to remove any non-carboxylated product. The sodium carbonate solution is next acidified with a 10% hydrochloric acid solution until it is distinctly acid to Congo. This acidified extract is extracted two additional times with 30 cc. of ether. The resulting ether extracts are combined and washed with 30 cc. of distilled water and then dried with anhydrous sodium sulfate, the ether being allowed to evaporate at room temperature. Through the foregoing procedure a solid residue remains, the same being composed of a mixture of carboxylated phenolic estrogenic hormones.

*Example 3*

One hundred mg. of estrone, $C_{18}H_{22}O_2$, are dissolved in 20 cc. of absolute alcohol. Then 15 mg. of metallic sodium dissolved in 10 cc. of absolute alcohol are mixed therewith and introduced into a dry round bottomed flask of 100 cc. capacity. The mass is then treated in accordance with the procedure outlined in Example 2. The product obtained consists of carboxylated estrone, which may be referred to as estrone salicylic acid, $C_{19}H_{22}O_4$, having the structural formula:

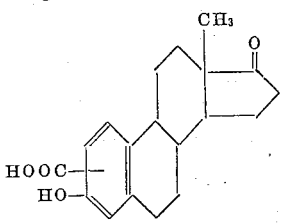

*Example 4*

One hundred mg. of estradiol, $C_{18}H_{24}O_2$, are dissolved in 20 cc. of absolute alcohol and then mixed with 15 mg. of metallic sodium dissolved in 10 cc. of absolute alcohol. The resulting solution is then treated in accordance with the procedure outlined in Example 2. The product obtained may be referred to as estradiol salicylic acid, $C_{19}H_{24}O_4$, having the structural formula:

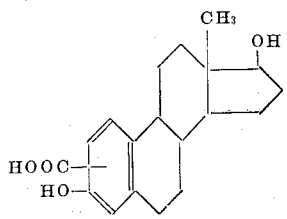

*Example 5*

One hundred mg. of equilin, $C_{18}H_{20}O_2$, are dissolved in 30 cc. of absolute alcohol and mixed in a round bottomed flask of 100 cc. capacity with 15 mg. of metallic sodium dissolved in 10 cc. of absolute alcohol. The reaction is then effected in accordance with the procedure outlined in Example 2. The purified material obtained may be referred to as equilin salicylic acid, $C_{19}H_{20}O_4$, having the structural formula:

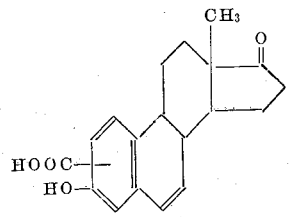

*Example 6*

Into a dry round bottomed flask of 100 cc. capacity there are introduced 100 mg. of equilenin, $C_{18}H_{18}O_2$, dissolved in 20 cc. of absolute alcohol and 15 mg. of metallic sodium dissolved in 10 cc. of absolute alcohol. The sodium salt of equilenin which forms is then carboxylated in accordance with the procedure set out in Example 2. The final purified product may be referred to as equilenin salicyclic acid, $C_{19}H_{18}O_4$, of the structural formula:

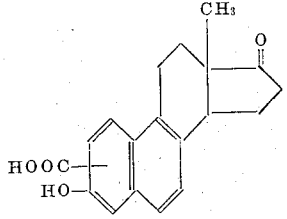

The sodium salts of the foregoing carboxylated estrogenic hormones may be prepared by dissolving 100 mg. of the same in 20 cc. of 95% ethyl alcohol and adding thereto 30 cc. of 0.1 N sodium hydroxide solution. The reaction mass is then evaporated to dryness on a steam bath. The residue obtained is next dissolved in 20 cc. of distilled water, after which the solution is filtered. The filtrate is again heated on a steam bath and the residue dissolved out with ether, the same consisting of the sodium salts of the carboxylated phenolic estrogenic hormones.

In order to illustrate the production of esters, a method forming the acetate is illustrated as follows:

*Neutral mono-esters*

Five hundred mg. of the sodium salt of the carboxylated phenolic hormone are dissolved in 20 cc. of ethyl alcohol. The solution is then transferred to an all glass reflux apparatus. Two cc. of methyl iodide are then added to the above solution. The mixture is then refluxed for 8 hours. After this treatment, the alcohol and the excess methyl iodide are removed from the reaction product by distillation under vacuum at a temperature below 50° C. The residue is next dissolved in ethyl acetate and this solution is then extracted first with 100 cc. of a 5% aqueous solution of sodium carbonate, and then with 50 cc. of distilled water. The ethyl acetate extract is then dried over anhydrous sodium sulfate. The solvent is then distilled off under reduced pressure and the ester recrystallized from alcohol.

*Acidic mono- and poly-esters*

Five hundred mg. of the free hormone salicylic acid are dissolved in 20 cc. of glacial acetic acid anhydride and the solution is refluxed in an all glass reflux apparatus for 24 hours. After this time the excess acetic acid anhydride and acetic acid are distilled off under reduced pressure, the temperature not exceeding 50° C. The residue is then crystallized from ethyl alcohol.

*Neutral poly-esters*

Five hundred mg. of the above acid ester are dissolved in alcohol and the calculated amount for complete neutralization of the free carboxyl group of sodium alcoholate, dissolved in a little ethyl alcohol, is added. The resulting alcoholic solution of the sodium salt of the acetylated hormone salicyclic acid is then transferred to an all glass reflux apparatus. Two cc. of methyl iodide are added to this solution and the mixture is then refluxed for 8 hours. It is then purified by procedure similar to that described above for the treatment of the mono-neutral esters.

It should be understood that the instant invention is not limited to the exact procedures given nor the compounds specifically mentioned, for it extends to all equivalents which will occur to those skilled in the art upon consideration of the scope of the claims appended hereto.

I claim:

1. The process for the preparation of new estrogenic compounds from crude estrogenic extract which comprises forming alkali metal salts of the phenolic estrogenic hormones contained in said extract, heating the said salts under substantially anhydrous conditions to a temperature of at least 140° C. in an inert atmosphere, introducing the carbon dioxide into the heated mass and reacting the gas with the said salts thereby forming carboxylated phenolic estrogenic hormones.

2. Process for the preparation of new estrogenic compounds which comprises forming alkali metal salts of the phenolic estrogenic hormones contained in crude estrogenic extract, heating the said salts to a temperature of at least 140° C. under substantially anhydrous conditions and in an inert atmosphere, introducing substantially dry carbon dioxide into the heated mass and reacting the gas with the said salts thereby forming carboxylated phenolic estrogenic hormones.

3. The process for the preparation of new estrogenic compounds which comprises forming alkali metal salts of phenolic estrogenic hormones contained in crude estrogenic extract which comprises heating the said salts to a temperature of at least 140° C. in an inert atmosphere, introducing carbon dioxide into the mass of the said salt of the estrogenic compound while the same presents a greatly extended surface area, and continuing the introduction of the carbon dioxide at the said temperature until the compounds are converted into the carboxylated phenolic estrogenic hormones.

4. Process for the preparation of new estrogenic compounds from crude estrogenic extract which comprises forming alkali metal salts of the phenolic estrogenic hormones contained in said extract, heating the said salts to a temperature of at least 140° C. under substantially anhydrous conditions in an inert atmosphere, introducing substantially dry carbon dioxide into the mass while the same presents a greatly extended surface area, the introduction of the carbon dioxide at such temperature being continued until the estrogenic compounds are converted into carboxylated phenolic estrogenic hormones.

5. The process specified in claim 4, wherein the greatly extended surface area of the salts of the estrogenic compounds is obtained by the inclusion in the body of the reaction mass a quantity of an inert absorbent material.

6. The process of preparing carboxylated phenolic estrogenic compounds which comprises heating alkali metal salts of phenolic estrogenic hormones to a temperature of from 140° to 250° C. in the substantial absence of water, air and hydrogen chloride and introducing substantially dry carbon dioxide into the heated mass while the same presents a greatly extended surface area until reaction takes place and carboxylated phenolic estrogenic hormones are obtained.

7. In the carboxylation of phenolic estrogenic hormones for the preparation of new estrogenic compounds through the reaction at elevated temperatures of carbon dioxide with alkali metal salts of the said compounds, the step which comprises, reacting the said salts in the presence of an inert gas.

8. In the carboxylation of phenolic estrogenic hormones for the production of new estrogenic compounds through the reaction at elevated temperatures of carbon dioxide with alkali metal salts of the said compounds, the steps which comprises, reacting the said salts in the presence of an inert gas and after the carboxylated hormone is formed, cooling the reaction mass in the absence of oxygen.

9. In the carboxylation of phenolic estrogenic compounds for the production of new estrogenic compounds through the reaction at elevated temperatures of carbon dioxide with alkali metal salts of the said compounds, the step which comprises, introducing a substantially pure and dry, inert gaseous medium into contact with the said salts during heating to raise the temperature to a point of at least 140° C.

10. The process of producing new estrogenic compounds which comprises heating alkali metal salts of phenolic estrogenic hormones in the substantial absence of water, air and hydrogen chloride to a temperature of the order of 180° C. and introducing substantially dry carbon dioxide in the hot mass until carboxylation of the hormones is complete.

11. A compound selected from the group consisting of carboxylated estrogenic hormones having the steroid structure, their esters and salts in which the carboxylic group is joined to the phenolic benzene ring through the carbon atom thereof and in ortho position to the phenolic hydroxyl group.

12. A compound selected from the group consisting of carboxylated estrone, its esters and salts of the structural formula:

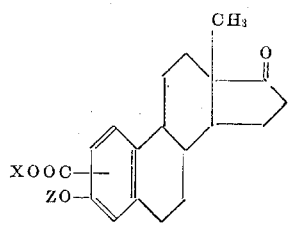

wherein the COOX radical is joined in an ortho position to the OZ group, the X is selected from the group consisting of H, a salt-forming atom and an alcoholic ester-forming radical, and Z is selected from the group consisting of H and a carboxylic ester-forming radical.

13. A compound selected from the group consisting of carboxylated estradiol, its esters and salts of the structural formula:

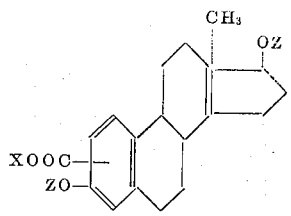

wherein the COOX radical is joined in an ortho position to the OZ group, the X is selected from the group consisting of H, a salt-forming atom and an alcoholic ester-forming radical, and Z is selected from the group consisting of H and a carboxylic ester-forming radical.

14. A compound selected from the group consisting of carboxylated equilin, its esters and salts of the structural formula:

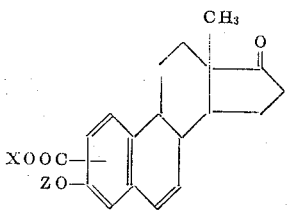

wherein the COOX radical is joined in an ortho position to the OZ group, the X is selected from the group consisting of H, a salt-forming atom and an alcoholic ester-forming radical, and Z is selected from the group consisting of H and a carboxylic ester-forming radical.

15. Carboxylated phenolic estrogenic hormones which are at least partially esterified the carboxylic group being joined to the phenolic benzene ring.

16. Carboxylated phenolic estrogenic hormones esterified at the carboxyl group the carboxylic group being joined to the phenolic benzene ring.

17. Carboxylated phenolic estrogenic hormones esterified at the phenolic hydroxy group the carboxylic group being joined to the phenolic benzene ring.

18. As new products the fatty acid ester of carboxylated phenolic estrogenic compounds having a free carboxylic group on the benzene ring in an ortho position to the acyl group.

19. As new products salts of carboxylated phenolic estrogenic hormones wherein the carboxylic group is in ortho position to the phenolic hydroxyl group.

JOSEPH B. NIEDERL.